United States Patent [19]

Cho

[11] Patent Number: 5,523,783
[45] Date of Patent: Jun. 4, 1996

[54] PAN HEAD CONTROL SYSTEM FOR TV CAMERA

[75] Inventor: Tadayoshi Cho, Ohmiya, Japan

[73] Assignee: Fuji Photo Optical Co., Ltd., Ohmiya, Japan

[21] Appl. No.: 89,843

[22] Filed: Jul. 12, 1993

[30] Foreign Application Priority Data

Oct. 19, 1992 [JP] Japan ................................ 4-279707

[51] Int. Cl.⁶ .................................................. H04N 5/30
[52] U.S. Cl. ............................................ 348/157; 348/169
[58] Field of Search ................................. 348/142, 169, 348/172, 213, 157, 279, 357, 373, 214, 190, 191, 211, 219, 333, 334; 395/904; 364/474.22, 474.23, 474.25, 474.26, 474.30, 474.31; H04N 5/26, 5/30

[56] References Cited

U.S. PATENT DOCUMENTS

| | | | |
|---|---|---|---|
| 3,953,669 | 4/1976 | Saccomani et al. | 178/6.8 |
| 3,978,280 | 8/1976 | Kavanagh et al. | 178/6.8 |
| 4,506,335 | 3/1985 | Magnuson | 364/474.31 |
| 4,566,036 | 1/1986 | Kadosawa | 358/210 |
| 4,581,647 | 4/1986 | Vye | 348/214 |
| 4,602,907 | 7/1986 | Foster | 434/337 |
| 4,734,845 | 3/1988 | Kawamura et al. | 364/474.26 |
| 4,851,905 | 7/1989 | Pryor | 348/169 |
| 4,945,417 | 7/1990 | Elberbaum | 348/213 |
| 4,974,088 | 11/1990 | Sasaki | 348/213 |
| 5,068,735 | 11/1991 | Tuchiya et al. | 348/213 |
| 5,278,767 | 1/1994 | Kishi et al. | 364/474.25 |
| 5,287,049 | 2/1994 | Olomski et al. | 364/474.22 |

FOREIGN PATENT DOCUMENTS 1-256876 of 0000 Japan.

Primary Examiner—Tommy P. Chin
Assistant Examiner—Vu Le
Attorney, Agent, or Firm—Brumbaugh, Graves, Donohue & Raymond

[57] ABSTRACT

A pan head control system for automatically panning and tilting a TV camera so that the aim of the TV camera is moved along a desired path on an object includes a pan head which supports a TV camera and is provided with a driving mechanism which drives the pan head to pan and/or tilt the TV camera under the control of a controller. A monitor TV is connected to the TV camera and projects an image taken by the TV camera on a screen. A plurality of points on the object through which the aim of the TV camera is to be passed are designated by touching a light pen at the images of the points on the image of the object projected on the screen of the monitor TV. The coordinates of the designated points on the screen are determined, stored and displayed on the screen of the monitor TV. A continuous trajectory line is plotted by properly joining the designated points on the screen of the monitor TV. Data on a plurality of points on the trajectory line are stored at predetermined intervals, and read out in order. The controller controls the driving mechanism to pan and tilt the TV camera so that the images of the points represented by the data read out are positioned at the center of the screen in order.

5 Claims, 6 Drawing Sheets

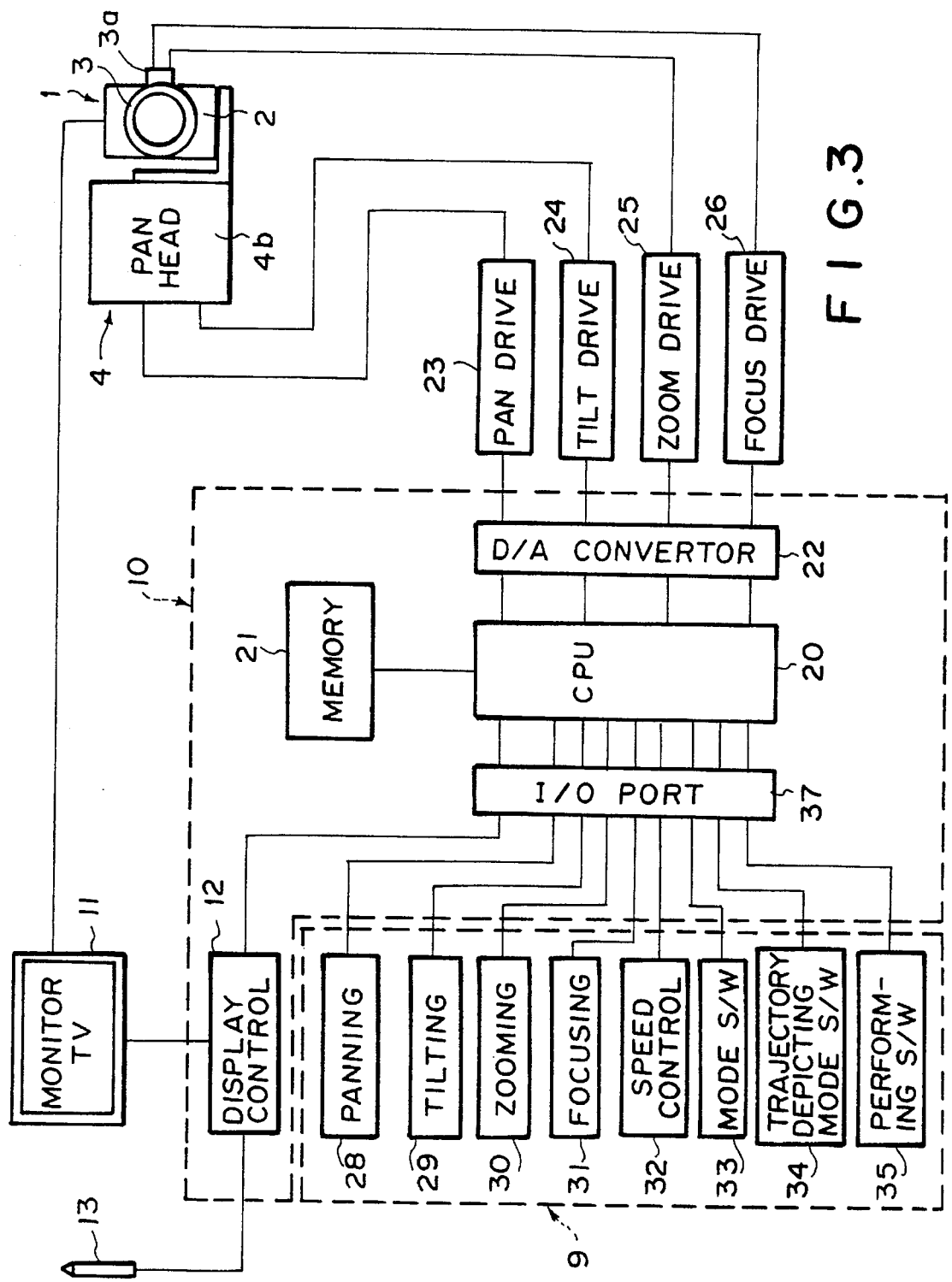
F I G. 3

PAN HEAD CONTROL SYSTEM FOR TV CAMERA

BACKGROUND OF THE INVENTION

1. Field of the Invention

This invention relates to a pan head control system for a TV camera which drives a pan head to pan and tilt a TV camera carried by the pan head.

2. Description of the Prior Art

When taking a picture of, for instance, track or motor race, the cameraman must pan and tilt a TV camera supported on a tripod on the course side to track moving objects such as racers while zooming and/or focusing the TV lens. Thus obtaining smooth images requires a great deal of skill.

There has been proposed a TV camera control system in which a TV camera is mounted on a pan head which is provided with a drive mechanism such as a servo mechanism for driving the pan head to pan and tilt the TV camera and the cameraman manipulates the drive mechanism by way of an actuator such as a joy stick of an operation unit. See, for instance, Japanese Unexamined Patent Publication No. 1(1989)-256876.

That is, the TV camera control system comprises a servo mechanism for swinging the pan head left and right and up and down to pan and tilt the TV camera, another servo mechanism for zooming and focusing the TV lens, a memory means for storing movements of the servo mechanisms as data, and control means which controls the servo mechanisms on the basis of the data stored in the memory means to reproduce the panning and tilting of the TV camera and the zooming and focusing of the TV lens.

In the TV camera control system, the data to be stored in the memory means is obtained by actually driving the pan head to move the aim of the TV camera to desired positions. Accordingly, when the aim of the TV camera is to be moved along a predetermined path as when taking a picture of track, data must be stored while moving the camera to move the aim of the TV camera to various points on the predetermined path and the number of the points must be as large as possible in order to smoothly move the TV camera in the following operation, which requires a long time and troublesome operation.

That is, when the TV camera is moved, the amount of the movement is difficult to determine on the TV screen, and accordingly, especially when the aim of the TV camera is to be moved along a curved path, a skilled cameraman is required to input the data.

SUMMARY OF THE INVENTION

In view of the foregoing observations and description, the primary object of the present invention is to provide a pan head control system for a TV camera in which the control data for panning and tilting the TV camera to move the aim of the TV camera along a desired path can be easily input.

Basically the pan head control system of the present invention comprises, as shown in FIG. 1, a pan head 4 on which a TV camera 1 is supported for panning and tilting, a pan drive means 6 which is mounted on the pan head 4 and drives the pan head 4 to pan the TV camera 1, and a tilt drive means 7 which is mounted on the pan head 4 and drives the pan head 4 to tilt the TV camera 1. A drive control means 8 outputs control signals to the pan drive means 6 and the tilt drive means 7 and controls the moving direction and the moving speed of the TV camera 1. Manipulating signals are input into the drive control means 8 from an actuator 9 such as a joy stick.

The picture taken by the TV camera 1 is displayed on the screen of a monitor TV 11 which is provided with a display control section 12 for inputting and outputting video information. To the display control section 12 is connected an input means 13 such as a light pen for designating points through which the aim of the TV camera 1 is to be passed on the screen of the monitor TV 11. That is, the input means 13 designates a plurality of points on the object through which the aim of the TV camera 1 is to be passed by designating the image of the points on the image of the object projected on the screen of the monitor TV 11. The aim of the TV camera 1 is represented by the point on the object the image of which is positioned at the center of the screen of the monitor TV 11.

Signals representing the points designated by the input means 13 are output to a trajectory point setting means 14 from the display control section 12. The trajectory point setting means 14 determines the coordinates of the designated points on the screen, memorizes them and causes the display control section 12 to display the designated points on the screen of the monitor TV 11. The trajectory point setting means 14 inputs the information on the designated points to a trajectory depicting means 15 and the trajectory depicting means 15 plots a continuous trajectory line properly joining the designated points on the screen of the monitor TV 11 and causes the display control section, 12 to display the continuous trajectory line on the screen of the monitor TV 11. The trajectory depicting means 15 inputs the information on the continuous trajectory line to a trajectory line memory means 16 which memorizes the data on a plurality of points on the trajectory line at predetermined intervals.

A data read-out means 17 reads out in order the data on the points on the trajectory line memorized in the trajectory line memory means 16 and outputs to the drive control means 8. The drive control means 8 outputs control signals to the pan drive means 6 and the tilt drive means 7 to cause them to pan and tilt the TV camera 1 so that the images of the points represented by the data read out by the data read-out means 17 are positioned at the center of the screen of the monitor TV 11 in order.

Preferably the trajectory point setting means 14 converts the data on the designated points to control data which correspond to the amounts of panning and tilting by which the TV camera 1 should be panned and tilted in order to position the images of the designated points at the center of the screen of the monitor TV 11 and memorizes them. Further, the trajectory line memory means 16 preferably memorizes the data on a plurality of points on the trajectory line in the form of such control data.

Preferably there is provided a speed control means 18 (as shown by the chained line) which controls the speed of panning and tilting when the TV camera 1 is automatically panned and tilted. The speed of panning and tilting may be controlled by causing the trajectory line memory means 16 to memorize data of speed superimposed on the data on a plurality of points on the trajectory line or by causing the data read-out means 17 to read out the data at a speed corresponding to the desired speed of panning and tilting.

In the pan head control system of the present invention, by operating the actuating member, the TV camera can be manually panned and tilted. When automatically swinging the TV camera so that the aim of the TV camera is moved along a desired path on an object, first the image of the object is projected on the screen of the monitor TV and a plurality of points on the object through which the aim of the TV camera is to be passed including the starting point and the end point are designated by designating the image of the points on the image of the object with the input means such as a light pen. When such points are designated, the trajectory point setting means determines the coordinates of the designated points on the screen, memorizes them and displays the designated points on the screen of the monitor TV, and the trajectory depicting means plots a continuous trajectory line by properly joining the designated points on the screen of the monitor TV. Then the trajectory line memory means memorizes data on a plurality of points on the trajectory line at predetermined intervals, whereby control data for controlling the pan drive means and the tilt drive means is obtained. The drive control means outputs control signals to the pan drive means and the tilt drive means in response to the data read-out means reading out in order the data on the points on the trajectory line memorized in the trajectory line memory means and causes the pan drive means and the tilt drive means to pan and tilt the TV camera so that the images of the points represented by the data read out by the data read-out means are positioned at the center of the screen in order, whereby the aim of the TV camera is moved along a path corresponding to the continuous trajectory line determined by the trajectory depicting means.

When the data on the designated points is converted to control data which corresponds to the amounts of panning and tilting by which the TV camera should be panned and tilted in order to position the images of the designated points at the center of the screen of the monitor TV and is memorized in the converted form, the trajectory line can be set over an area which is wider than can be projected in one frame, which makes it feasible to set the trajectory line on a zoomed-up image.

When the speeds of panning and tilting are controlled by the speed control means and the data obtained is memorized superimposed on the data on a plurality of points on the trajectory line, also the speeds of panning and tilting can be automatically controlled in response to the automatic panning and tilting of the TV camera.

BRIEF DESCRIPTION OF THE DRAWINGS

FIG. 3 is a block diagram showing the control section of the system.

DESCRIPTION OF THE PREFERRED EMBODIMENT

Figure 1:
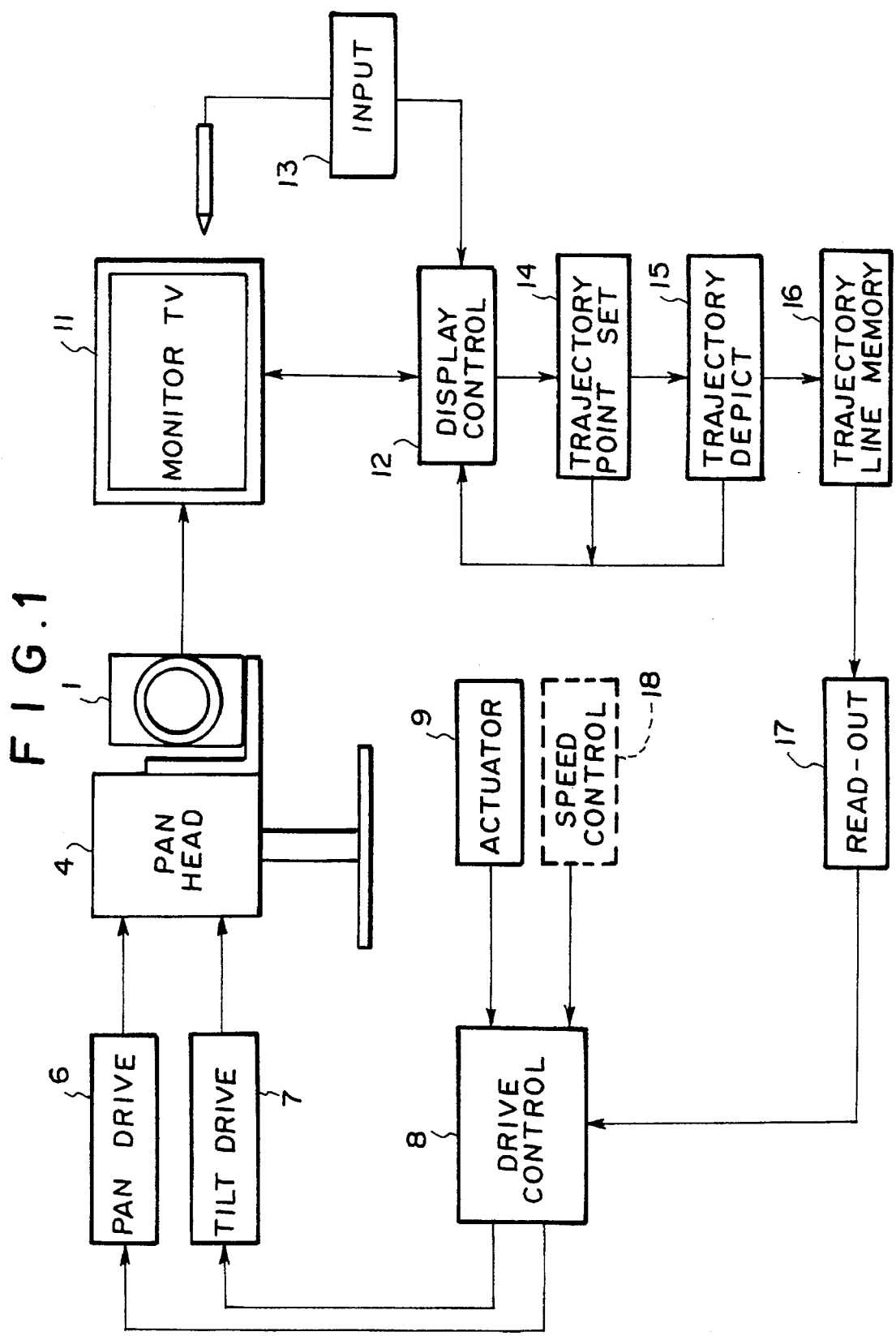
FIG. 1 is a schematic view for illustrating the basic arrangement of the pan head control system of the present invention.
Figure 2:
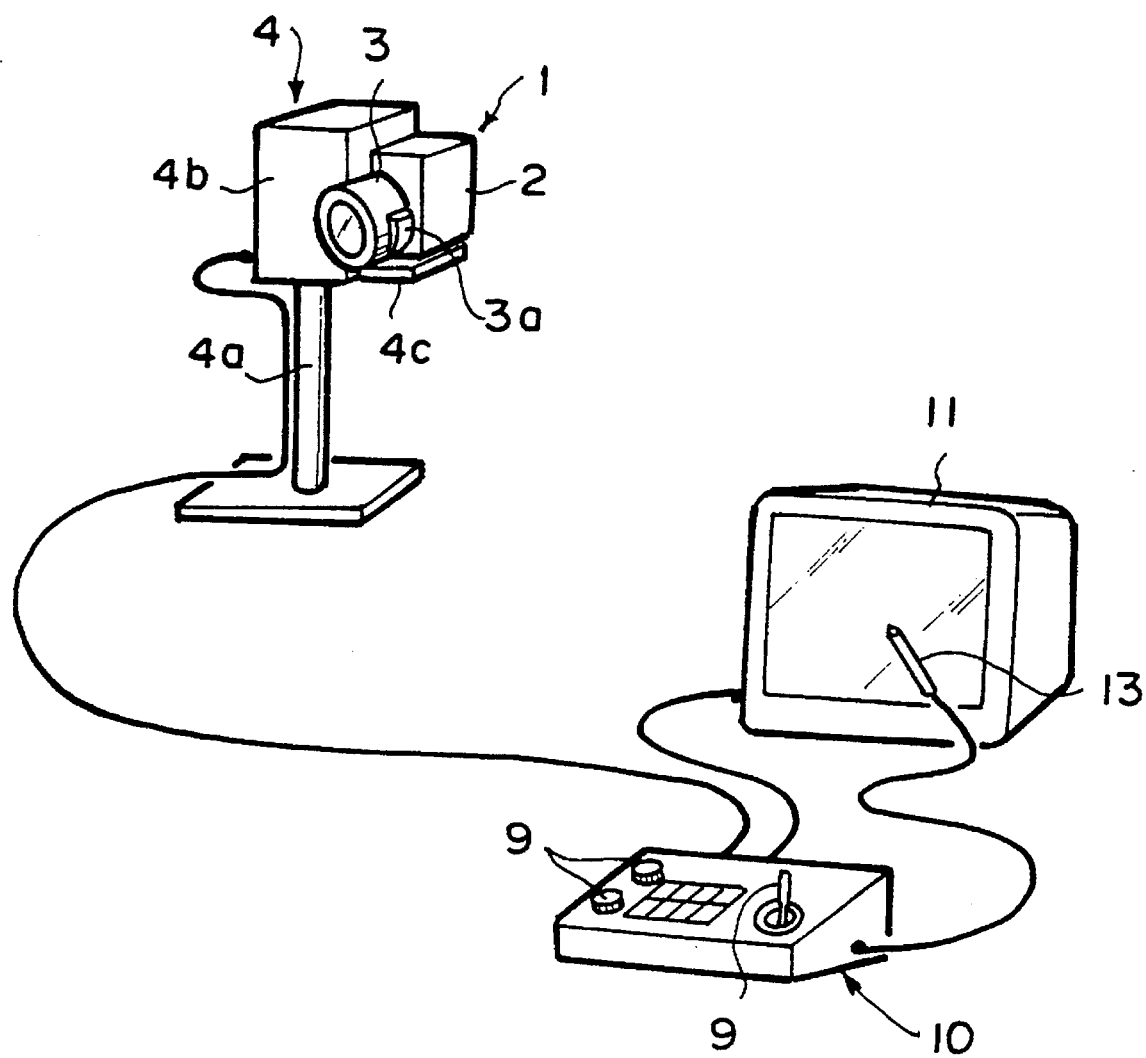
FIG. 2 is a perspective view showing a pan head control system in accordance with an embodiment of the present invention.

In FIG. 2, the parts analogous to the parts shown in FIG. 1 are given the same reference numerals. In FIG. 2, a TV camera 1 comprises a camera body 2 and a zoom lens 3 mounted thereon. A pan head 4 comprises a support post 4a, a head body 4b which is mounted on the support post 4a to be rotatable left and right relative to the support post 4a and a camera support 4c which is rotatable up and down relative to the head body 4b. The camera body 2 is supported on the camera support 4c. Thus when the head body 4b is rotated left and right relative to the support post 4a, the TV camera 1 is panned and when the camera support 4c is rotated up and down relative to the head body 4b, the TV camera 1 is tilted. Though not shown, a servo mechanism for rotating the head body 4b left and right relative to the support post 4a and for rotating the camera support 4c up and down relative to head body 4b is provided in the head body 4b. The TV camera 1 is further provided with a lens driving mechanism 3a which zooms and focuses the zoom lens 3 and may comprise a servo mechanism.

An operation unit 10 for remote-controlling the TV camera 1 is provided separately from the TV camera 1. Though not shown in detail in FIG. 2, the operation unit 10 is provided with various actuating members 9 such as a joy stick, a zoom switch, a focusing dial and a speed control member and the like for manually controlling the TV camera 1. Though not shown, the operation unit 10 is further provided with various control switches such as a mode switch for switching the operational mode between a manual picture-taking mode and an automatic picture-taking mode, a trajectory depicting mode switch for switching the operational mode to a trajectory depicting mode for depicting the trajectory line, a performing switch and the like.

A monitor TV 11 is connected to the operation unit 10 and an image taken by the TV camera 1 is projected on the screen of the monitor TV 11. Further a light pen 13 for inputting information on the screen of the monitor TV 11 is connected to the operation unit 10.

As shown in FIG. 3, the operation unit 10 has a CPU 20 and a display control section 12 which controls the monitor TV 11 and the light pen 13. A memory (RAM, ROM) 21 is connected to the CPU 20 by way of a data bus.. Control signals are output from the CPU 20 to a pan drive circuit 23, a tilt drive circuit 24, a zoom drive circuit 25 and a focus drive circuit 26 through a D/A convertor. 22. Drive signals are output from the respective drive circuits 23 to 26 to the servo mechanisms (servomotors) provided in the head body 4b and the lens driving mechanism 3a to pan and tilt the TV camera 1 and to zoom and focus the zoom lens 3. The positions of the TV camera 1 and the zoom lens 3 are detected by position sensors such as potentiometers.

The positions of the TV camera 1 and the zoom lens 3 detected by the position sensors are input to the drive circuits 23 to 26 (servo amplifiers) together with the control signals (position signals) from the D/A convertor 22, and the servomotors are feedback-controlled.

Said actuating members 9 include a panning section 28, a tilting section 29, a zooming section 30, a focusing section 31, a speed control section 32, a mode switch 33, a trajectory depicting mode switch 34 and a performing switch 35. Signals representing the manipulated variables are input into the CPU 20 through an input/output port 37 from the panning section 28, tilting section 29, zooming section 30, focusing section 31 and speed control section 32, and signals representing the positions of the switches are input into the CPU 20 through the input/output port 37 from the mode switch 33, trajectory depicting mode switch 34 and performing switch 35.

In the manual picture-taking mode, an operator manually operates the various actuating members 9 such as the panning section 28, the tilting section 29, the zooming section 30, the focusing section 31 and the like to take a desired picture. In the automatic picture-taking mode, the pan drive circuit 23 and the tilt drive circuit 24 are automatically controlled to pan and tilt the TV camera 1 along a predetermined path which is and memorized beforehand. In order to input the data on the predetermined path, the manual picture-taking mode has the trajectory depicting mode.

Figure 4:
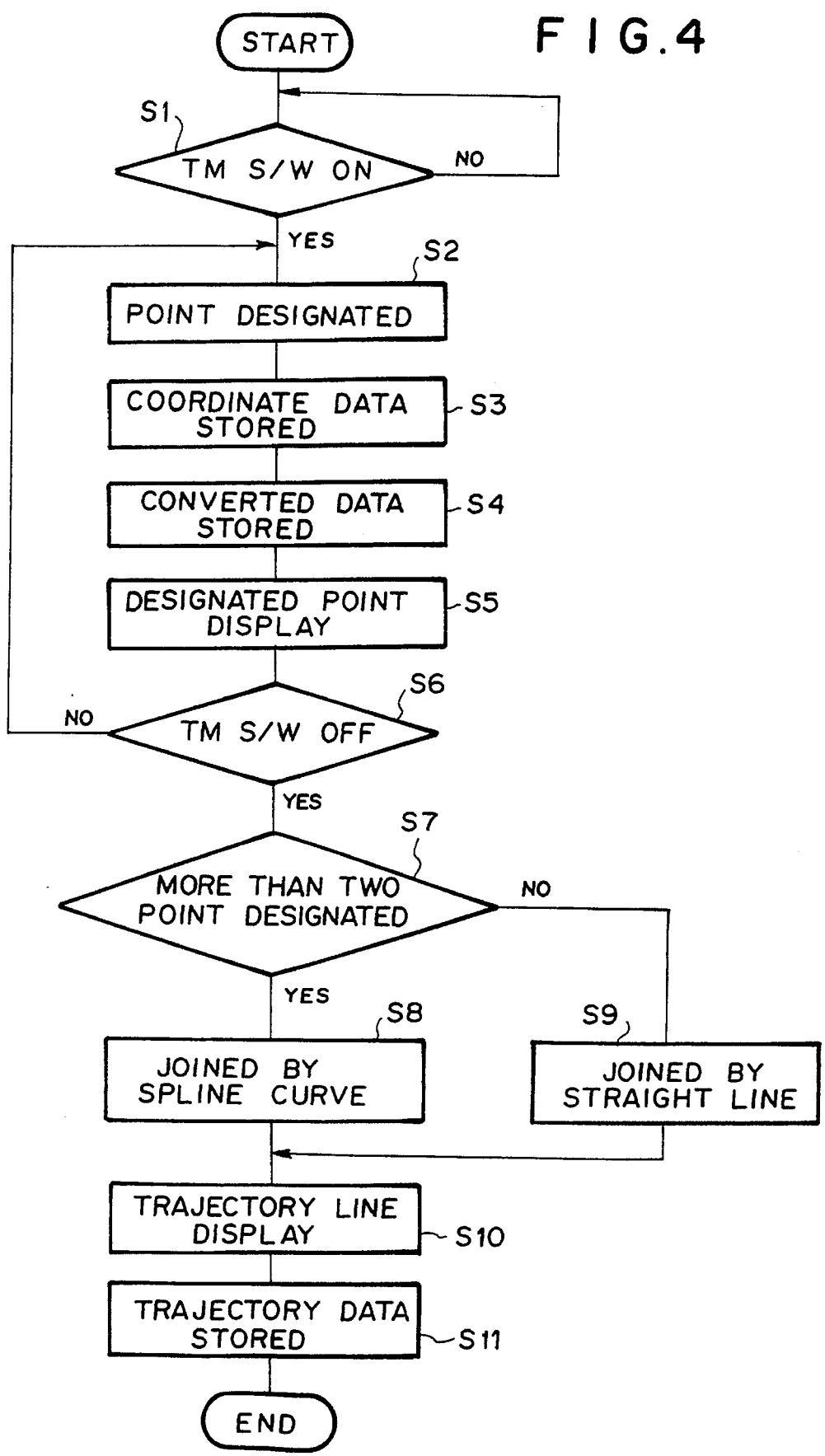
FIG. 4 is a flow chart for illustrating the process of depicting the trajectory line.

The processing in the trajectory depicting mode will be described with reference to the flow chart shown in FIG. 4, hereinbelow.

Figure 6A:
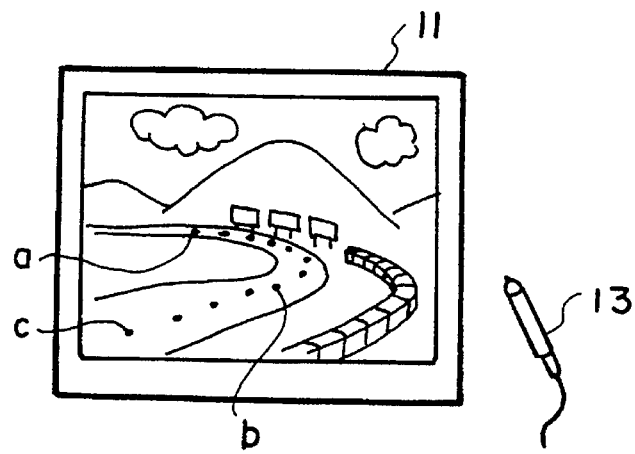
FIGS. 6A to 6C are views for illustrating the operation of the pan head control system.

With the manual picture-taking mode being selected by operation of the mode switch 33, the TV camera 1 is manually operated to project on the screen of the monitor TV 11 an image of an object which includes a path along which the aim of the TV camera 1 is to be moved as shown in FIG. 6A. Then the trajectory depicting mode is selected by operation of the trajectory depicting mode switch (abbreviated to TM S/W in FIG. 4) 34. (step S1) Thereafter the operator designates a plurality of points on the object through which the aim of the TV camera 1 is to be passed by designating the image of the points on the image of the object projected on the screen of the monitor TV. Assuming that the aim of the TV camera 1 is to be passed through the points shown by dots in FIG. 6A starting from point a and ending at point c, the operator first touches the light pen 13 to the screen at point a. (step S2) When a signal is input from the light pen 13, the display control section 12 outputs horizontal counts and vertical counts representing the coordinates of the point a to the CPU 20, and the CPU 20 stores the coordinate data of the point a in the memory 21. (step S3) At the same time, the CPU 20 converts the coordinate data to control data which correspond to the amounts of panning and tilting by which the TV camera should be panned and tilted in order to position the point a at the center of the screen of the monitor TV 11 on the basis of the present position of the TV camera 1 and stores them in the memory 21. (step S4) Then the CPU 20 causes the display control section 12 to display the point a on the screen. (step S5)

Thereafter, the operator touches the light pen 13 to the screen at the next point and steps S2 to S5 are repeated. Thus the points including the starting point a, intermediate points b and the ending point c are input in order. The number of the points to be input and the intervals therebetween are determined so that a desired. trajectory line can be plotted by joining the points. If the path along which the TV camera 1 is to be panned and tilted extends beyond one frame, the TV camera 1 is manually panned and tilted to scroll the screen and points on the path are input on the screen. In this case the data on the points input after scrolling of the screen must be converted to conform to the data on the points input before scrolling.

Figure 6B:
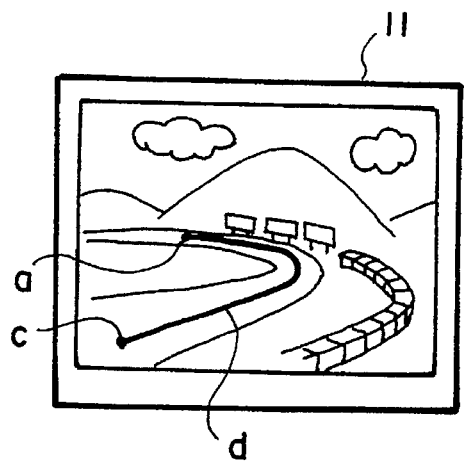

The operator turns off the trajectory depicting mode switch 34 after inputting the ending point c. When the trajectory depicting mode switch 34 is turned off (step S6), the CPU 20 determines whether the number off the points input is more than 2. (step S7) When it is determined that more than 2 points have been designated, the CPU 20 plots the trajectory line by joining the designated points by a spline curve. (step S8) When it is determined that only two points have been designated, the CPU 20 plots the trajectory line by joining the designated points by a straight line. (step S9) Then the CPU 20 causes the display control section 12 to display the trajectory line d thus obtained on the screen as shown in FIG. 6B (step S10) and stores data on a plurality of points on the trajectory line d at predetermined intervals in the memory 21 (step S11).

Figure 5:
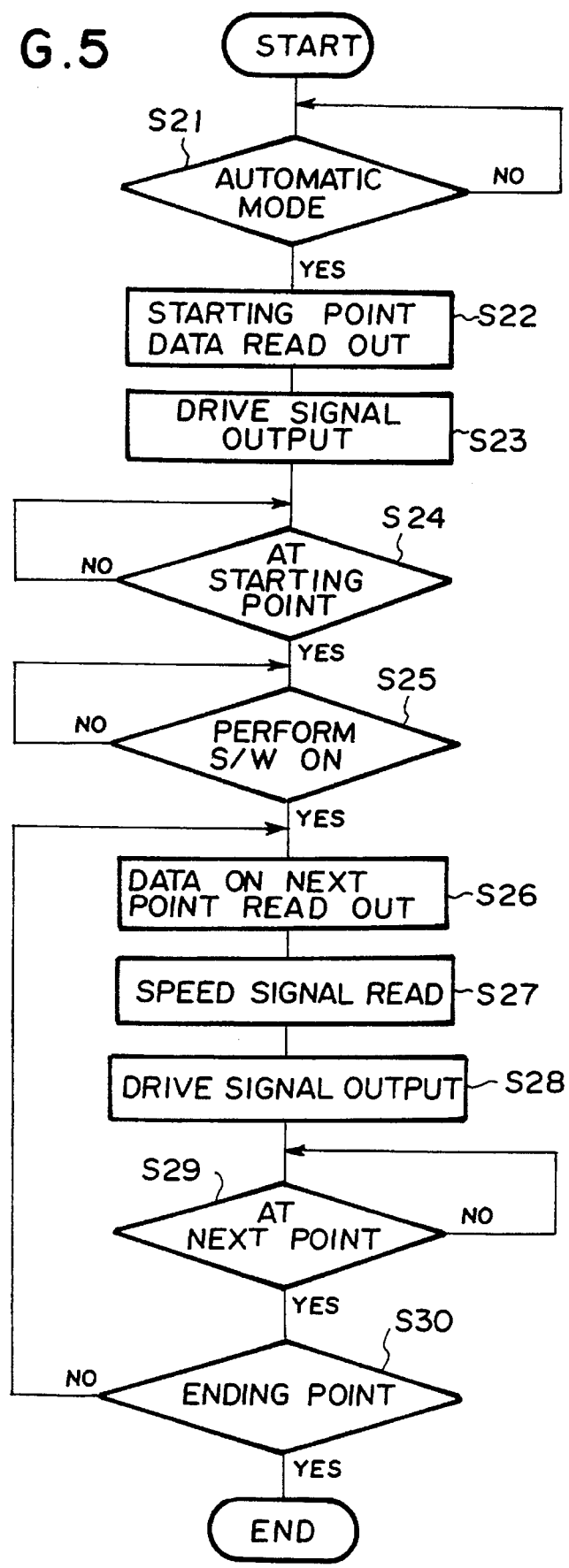
FIG. 5 is a flow chart for illustrating the process of automatically panning and tilting the TV camera.

The processing in the automatic picture-taking mode will be described with reference to the flow chart shown in FIG. 5, hereinbelow.

When the automatic picture-taking mode is selected by operation of the mode switch 33 (step S21), the CPU 20 reads out the data on the starting point a (step S22) and outputs control signals to the pan drive circuit 23 and the tilt drive circuit 24 to cause them to pan and tilt the TV camera 1 so that the image of the starting point a is positioned at the center of the screen (step S23). When the the image of the starting point a is positioned at the center of the screen and the performing switch 35 is turned on (steps S24 and S25), the automatic picture-taking is initiated.

That is, the CPU 20 reads out the data on the point next to the starting point on the trajectory line stored in the memory 21 (step S26), and reads a speed signal from the speed control section 32 (step S27), and outputs control signals to the pan drive circuit 23 and the tilt drive circuit 24 to cause them to pan and tilt the TV camera 1 so that the image of the next point is positioned at the center of the screen on the basis of the data on the next point and the speed signal(step S28). When the TV camera 1 is actually moved to the position where the image of the next point is positioned at the center of the screen, the CPU 20 determines where the next point is the ending point c. (steps S29 and S30) The CPU 20 reads out the data on the points on the trajectory line stored in the memory 21 one by one and repeats steps S26 to S30 until the image of the ending point c is positioned at the center of the screen.

Figure 6C:
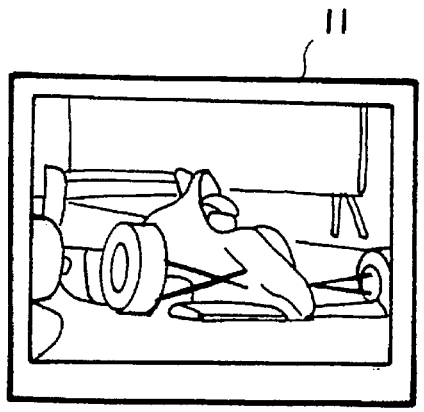

In the embodiment described above, zooming and focusing of the lens 3 are manually effected even in the automatic picture-taking mode, and in the automatic picture-taking mode, a picture such as shown in FIG. 6C is obtained. Thus, in accordance with the present invention, the TV camera 1 can be automatically panned and tilted to track moving objects such as racing cars which move along a predetermined path, thereby eliminating necessity of panning and tilting operation of the operator and facilitating operation of the operator.

When the moving speed of the object can be estimated in advance, the automatic picture-taking is once performed while controlling the moving speed of the TV camera 1 by the speed control section 32 on the basis of the estimated moving speed of the object and the data on the moving speed of the TV camera 1 obtained is stored superimposed on the data on the trajectory line. In this manner, the moving speed of the TV camera 1 also can be automatically controlled. Further also the zooming operation and the focusing operation can be automatical by performed by storing the data on zooming and focusing superimposed on the data on the trajectory line.

Though, in the embodiment described above, the moving speed of the TV camera 1 is controlled by setting the moving speed of the TV camera 1 from one point to another, the moving speed of the TV camera 1 may be controlled by controlling the speed at which the data on the points on the trajectory line is read out.

When storing the data on a plurality of points on the trajectory line plotted by joining the points designated by the light pen 13, the intervals at which the data on the points is stored may be determined depending on the accuracy requirement and the storage capacity of the memory 21.

What is claimed is:

1. A pan head control system for automatically panning and tilting a TV camera so that the aim of the TV camera is moved along a desired predetermined path on an object comprising a pan head which supports a TV camera and is provided with a driving mechanism which drives the pan head to pan and/or tilt the TV camera, a drive control means which outputs control signals to the driving mechanism and controls the same, an actuating member for controlling the driving mechanism by way of the drive control means, a monitor TV which is connected to the TV camera and projects an image taken by the TV camera on a screen, an input means which designates a plurality of points on the object through which the aim of the TV camera is to be passed by designating the images of the points on the image of the object projected on the screen of the monitor TV, a trajectory point setting means which determines the coordinates of the designated points on the screen, memorizes them and displays the designated points on the screen of the monitor TV, a trajectory depicting means which plots a continuous trajectory line by properly joining the designated points on the screen of the monitor TV, a trajectory line memory means which memorizes data on a plurality of points on the trajectory line at predetermined intervals, and a data read-out means which reads out in order the data on the points on the trajectory line memorized in the trajectory line memory means, said drive control means controlling the driving mechanism to pan and tilt the TV camera so that the images of the points represented by the data read out by the data read-out means are positioned at the center of the screen in order.

2. A pan head control system as defined in claim 1 in which said trajectory point setting means converts the coordinates of the designated points to control data which correspond to the amounts of panning and tilting by which the TV camera should be panned and tilted in order to position each of the designated points at the center of the screen of the monitor TV and stores them, and said trajectory line memory means stores the data on a plurality of points on the trajectory line on the basis of the control data.

3. A pan head control system as defined in claim 1 further comprising a speed control means which controls the speed of panning and tilting of the TV camera.

4. A pan head control system as defined in claim 1 in which said trajectory line memory means stores data on the speed of panning and tilting of the TV camera superimposed on the data on a plurality of points on the trajectory line.

5. A pan head control system as defined in claim 1 in which said data read-out means reads out the data at a speed which corresponds to the speed at which the TV camera is to be panned and tilted.

* * * * *